United States Patent
Shetty et al.

(10) Patent No.: US 10,977,263 B2
(45) Date of Patent: Apr. 13, 2021

(54) OPTIMIZATION OF MULTIPLE QUERY FILTERS

(71) Applicant: SAP SE, Walldorf (DE)

(72) Inventors: Arpitha A Shetty, Dakshina Kannada (IN); Vijaya Pramilamma Bovilla, Badvel (IN); Sudarshan Pavanje, Mangalore (IN); Abhishek Nagendra, Bangalore (IN); Unmesh Sreedharan, Kottayam (IN)

(73) Assignee: SAP SE, Walldorf (DE)

( * ) Notice: Subject to any disclaimer, the term of this patent is extended or adjusted under 35 U.S.C. 154(b) by 220 days.

(21) Appl. No.: 15/824,521

(22) Filed: Nov. 28, 2017

(65) Prior Publication Data

US 2019/0163797 A1 May 30, 2019

(51) Int. Cl.
*G06F 16/248* (2019.01)
*G06F 16/2457* (2019.01)
*G06F 16/2453* (2019.01)

(52) U.S. Cl.
CPC ........ *G06F 16/248* (2019.01); *G06F 16/2453* (2019.01); *G06F 16/2457* (2019.01)

(58) Field of Classification Search
None
See application file for complete search history.

(56) References Cited

U.S. PATENT DOCUMENTS

| 7,912,823 | B2 * | 3/2011 | Ferrari | G06F 16/00 707/705 |
| 8,838,623 | B2 * | 9/2014 | Winter | G06F 16/2343 707/754 |
| 2008/0208862 | A1 * | 8/2008 | Winter | G06F 16/2343 |
| 2009/0198682 | A1 * | 8/2009 | Buehler | G06F 16/335 |
| 2016/0140174 | A1 * | 5/2016 | Weyerhaeuser | G06F 16/24542 707/718 |
| 2018/0004813 | A1 * | 1/2018 | Smith | G06F 16/2237 |
| 2019/0163797 | A1 * | 5/2019 | Shetty | G06F 16/248 |

\* cited by examiner

*Primary Examiner* — Kim T Nguyen
(74) *Attorney, Agent, or Firm* — Buckley, Maschoff & Talwalkar LLC

(57) ABSTRACT

A system includes identification of dimension filters associated with a visualization, identification, from the identified dimension filters, of nested dimension filters associated with a first dimension, generation of a composite filter based on the identified nested dimension filters, transmission of a query to a data source, the query including the composite filter, reception of a result set based on the query from the data source, and display of the visualization presenting the result set on the display.

17 Claims, 7 Drawing Sheets

| HIGHER /LOWER LEVEL | In list | Equals | Not in list | Not equals | Between | Greater than | Greater than equal | Less than | Less than equals |
|---|---|---|---|---|---|---|---|---|---|
| In list | Consider common values | Consider common values | Both Values | Both Values | Consider in list value if it falls in the range | Consider common values | Consider common values | Consider common values | Consider common values |
| Equals | Consider common values | Consider common values | Both Values | Both Values | Consider in list value if it falls in the range | Consider common values | Consider common values | Consider common values | Consider common values |
| Not in list | Both Values | Both Values | Both Values | Both Values | Both Values | Both Values | Both Values | Both Values | Both Values |
| Not equals | Both Values | Both Values | Both Values | Both Values | Both Values | Both Values | Both Values | Both Values | Both Values |
| Between | Consider common values | Consider common values | Both Values | Both Values | Min value would be max of the range Max value would be min of the range | Min value would be the value present in GT values. Exclude GT value | Min value would be the value present in GE. | Max value would be the value present in LT values. Exclude LT value | Max value would be the value present in LT. |
| Greater than | Consider common values | Consider common values | Both Values | Both Values | Min value would be the value present in GT values. Exclude GT value | Take the greatest value | Take the greatest value and the operator | Create a range out of max value from LT, min value from GT. Exclude LT and GT | Create a range out of max value from LE, min value from GT. Exclude GE value |
| Greater than equals | Consider common values | Consider common values | Both Values | Both Values | Min value would be the value present in GE. | Take the greatest value and the operator | Take the greatest value | Create a range out of max value from LE, min value from GE. Exclude LT value | Create a range out of max value from LE, min value from GE. |
| Less than | Consider common values | Consider common values | Both Values | Both Values | Max value would be the value present in LT values. Exclude LT value | Create a range out of max value from LT, min value from GT. Exclude LT and GT | Create a range out of max value from LE, min value from GE. Exclude LT value | Take the lowest value | Take the lowest value and operator |
| Less than equals | Consider common values | Consider common values | Both Values | Both Values | Max value would be the value present in LT. | Create a range out of max value from LE, min value from GT. Exclude GE value | Create a range out of max value from LE, min value from GE. Exclude LT value | Take the lowest value and operator | Take the lowest value |

FIG. 7

OPTIMIZATION OF MULTIPLE QUERY FILTERS

BACKGROUND

Enterprise software systems receive, generate, and store data related to many aspects of an enterprise. Users operate client applications to access such data and present the data in useful formats, such as in graphic visualizations. For example, some conventional client applications receive user-submitted queries (e.g., Sales by Country), and present a visualization (e.g., a bar graph, a pie chart, a geomap) of a result set corresponding to the query.

A user may apply one or more filters to a result set visualization. For example, the filter Sales>20 may be applied to a visualization which is associated with the query Sales by Country. A visualization may belong to a page or other higher-level container which is also associated with one or more respective filters. Continuing the present example, the page of the visualization may be associated with the filter Sales>25. Accordingly, the visualization should render only values which satisfy both filters (i.e., Sales<20 AND Sales<25).

Conventionally, the filters associated with a visualization are applied by querying a data source iteratively from the highest to lowest-level container. In the example, the data source is first queried for Sales by Country where Sales<25. A result set of the first query is then queried using the query Sales by Country where Sales<20. This iterative approach may consume an unacceptable amount of processing resources and/or time, particularly as the number of container levels and number of queried dimensions increases.

BRIEF DESCRIPTION OF THE DRAWINGS

FIG. 7 is a table describing different query conversions according to some embodiments.

DETAILED DESCRIPTION

The following description is provided to enable any person in the art to make and use the described embodiments. Various modifications, however, will remain readily apparent to those in the art.

Generally, according to some embodiments, multiple filters associated with a same dimension at different visualization levels are resolved to a single composite filter. The single composite filter is used to query a data source for a result set to be visualized. Embodiments may therefore efficiently reduce a number of backend calls from x (wherein x=the number of nested filter levels) to one.

Resolution according to some embodiments includes generating an OR-based filter which provides a same result set as a plurality of filters joined by one or more AND operators. The OR-based filter may be efficiently generated based on local metadata rather than using database queries.

Figure 1:
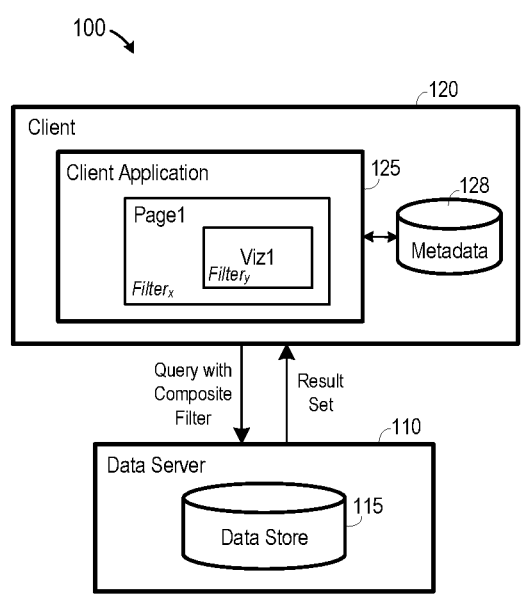
FIG. 1 is a block diagram of a system architecture according to some embodiments.

FIG. 1 is a block diagram of system 100 according to some embodiments. Embodiments are not limited to the FIG. 1 system. System 100 includes data server 110 and client system 120. Data server 110 and client system 120 may communicate over any number of intermediate public or private networks, including but not limited to the World Wide Web.

According to some embodiments, client system 120 executes client application 125 to generate visualizations of data stored in data store 115. For example, client system 120 may execute client application 125 to present a user interface to a user on a display of client system 120. The user then operates the user interface to define a visualization.

A visualization may be defined based on metadata of metadata store 128. The metadata may define objects which are mapped to logical entities of data store 115. Each object associates one or more physical entities (e.g., a physical database table, associated columns of one or more database tables, etc.) of one or more enterprise data sources with user-friendly names. These objects may be classified as dimensions, along which one may want to perform an analysis or report (e.g., Year, Country, Product) or measures (e.g., Sales, Profit), whose values can be determined for a given combination of dimension values. Metadata store 128 may comprise local storage of client system 120, such as but not limited to Flash memory, a fixed disk drive, and volatile or non-volatile Random Access Memory.

Accordingly, a user may operate client application 125 to define a visualization based on a combination of one or more measures, dimensions, dimension values and/or filters defined by the metadata of metadata store 128. Client application 125 may provide any suitable user interface metaphor to define a visualization that is or becomes known. For example, client application 125 may allow a user to define one or more dimensions per visualization axis and one or more measures to be determined based on the axes, using selectable checkboxes, multi-selection drop-down boxes, a drag-and-drop interface and/or other metaphors.

Also, as is known in the art, the user may associate a visualization with one or more filters per dimension or measure. The filters may include or exclude a range of values, or may include or exclude one or more particular values, as is also known in the art. For example, visualization Viz1 of FIG. 1 is associated with filter $Filter_y$. Accordingly, visualization Viz1 will present only data which satisfies filter $Filter_y$.

A user may also operate client application 125 to define one or more higher-level containers and filters thereof. For example, according to some embodiments, a "page" may be defined which includes one or more other visualizations. FIG. 1 illustrates page Page1 including visualization Viz1. Page Page1 is associated with filter $Filter_x$. Accordingly, any visualization within page Page1 presents data which satisfies $Filter_x$ and any other filters associated with the visualization. In the case of Viz1, the data presented therein satisfies $Filter_x$ AND $Filter_y$.

As described above, client application 125 generates a composite OR-based filter based on the $Filter_x$ and $Filter_y$ and transmits a query including the composite filter to data server 110. Data server 110 operates to return a corresponding result set to client application 125 based on data of data store 115, and client application 125 generates and renders visualization Viz1 based thereon. The result set incorporates the data filtering specified by both $Filter_x$ and $Filter_y$, and embodiments may thereby reduce a number of queries to data server in comparison to conventional systems.

Client system 120 may comprise any suitable computing device capable of executing client application 125 to request and receive a result set from data server 110. Client system 120 may comprise, for example, a desktop computer, a laptop computer, a tablet computer, or a smartphone. Client application 125 may comprise a data analysis application which facilitates data visualization and analysis, but embodiments are not limited thereto. According to some embodiments, client application 125 comprises a Web application executed within a Web browser of client system 120.

Data server 110 may also comprise any query-responsive data server that are or become known, including but not limited to a structured-query language (SQL) relational database management system. Data store 115 may comprise any data sources which are or become known, including but not limited to database views, spreadsheets, relational databases and/or OnLine Analytical Processing cubes. The data of data store 115 may be distributed among several relational databases, dimensional databases, and/or other data sources. Embodiments are not limited to any number or types of data sources.

In some embodiments, the data of data store 115 may comprise one or more of conventional tabular data, row-based data, column-based data, and object-based data. Moreover, the data may be indexed and/or selectively replicated in an index to allow fast searching and retrieval thereof. Data store 115 may support multi-tenancy to separately support multiple unrelated clients by providing multiple logical database systems which are programmatically isolated from one another.

Data store 115 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database). A hardware processing system implementing database server 110 (e.g., a server blade) may be physically integrated with or separate from a hardware storage system (e.g., a fixed disk array, volatile Random Access Memory) implementing data store 115.

Figure 2:
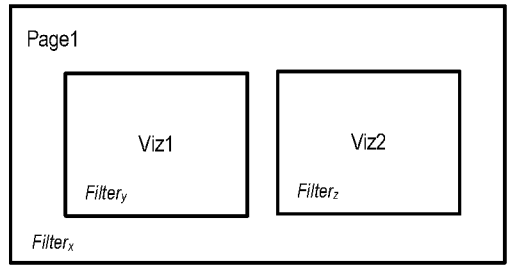
FIG. 2 is a diagram of a user interface presenting filtered data visualizations of a filtered page container according to some embodiments.

FIG. 2 illustrates page container Page1 including visualizations Viz1 and Viz2 according to some embodiments. Page1 is associated with $Filter_x$, visualization Viz1 is associated with filter $Filter_y$, and visualization Viz2 is associated with filter $Filter_z$. According to some embodiments, the result set for visualization Viz1 is obtained by generating a composite OR-based filter based on $Filter_x$ and $Filter_y$, and issuing a query including the composite filter. Similarly, the result set for visualization Viz2 is obtained by generating a composite OR-based filter based on $Filter_x$ and $Filter_z$ and issuing a query including this composite filter. In contrast, conventional systems would generate the result set for visualization Viz1 by issuing a first query including $Filter_x$ and then a second query including $Filter_y$, and would generate the result set for visualization Viz2 by issuing a third query including $Filter_x$ and then a fourth query including $Filter_z$.

Figure 3:
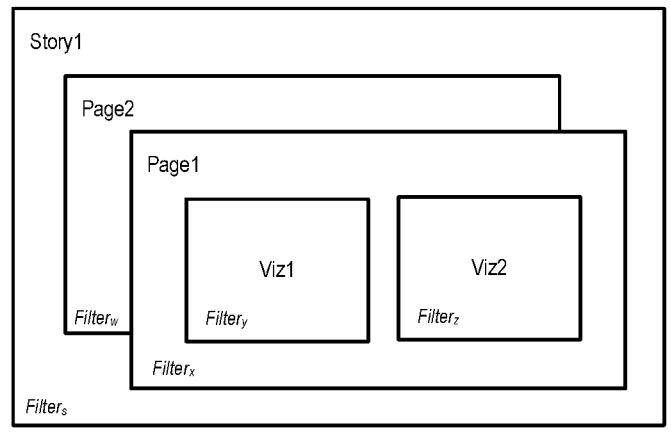
FIG. 3 is a diagram of a user interface presenting filtered data visualizations of a filtered page container and a filtered story container according to some embodiments.

Embodiments may provide for any number of container levels. For example, a "story" may be defined to include one or more pages, with each page including one or more visualizations as described above. A user may also associate the story with one or more filters. FIG. 3 illustrates story Story1 including pages Page1 and Page2. Story Story1 is associated with filter $Filter_s$. Accordingly, visualization Viz1 of page Page1 presents data filtered by filters $Filter_s$, $Filter_x$ and $Filter_y$. Embodiments may operate to generate a single composite filter based on $Filter_s$, $Filter_x$ and $Filter_y$ as will be described below.

Figure 4:
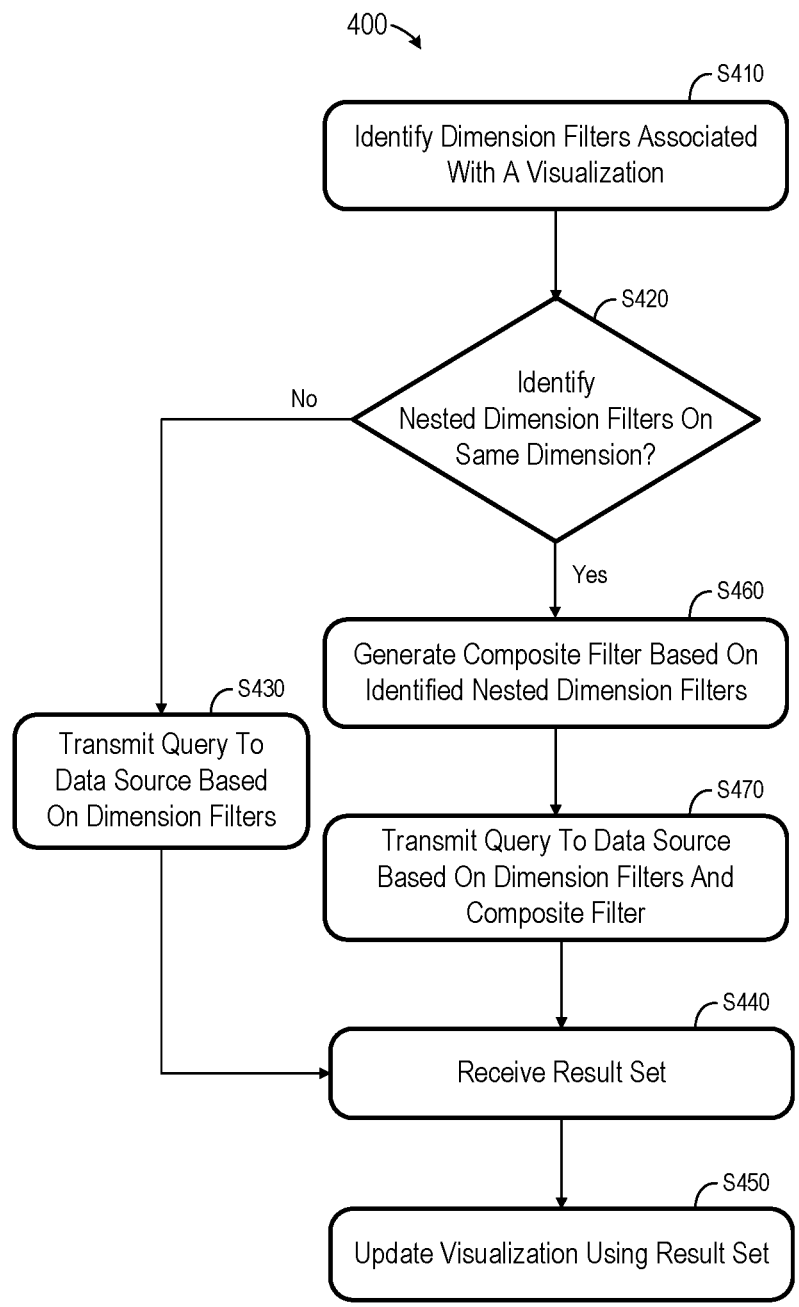
FIG. 4 is a flow diagram of a process according to some embodiments.

FIG. 4 comprises a flow diagram of process 400 to according to some embodiments. In some embodiments, various hardware elements of system 100 execute program code to perform process 400. Process 400 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

It is assumed that, prior to process 400, one or more visualizations have been defined, each including one or more dimensions, one or more measures, and one or more filters. The one or more visualizations may comprise any graphic for presenting data, and may be defined using any suitable system that is or becomes known.

According to some embodiments, one or more of the one or more visualizations is defined within a container which itself is associated with one or more filters. The pages described above are examples of such a container. Embodiments may employ any number of container levels, with each container being "nested" within its associated higher-level containers. In the present description, filters associated with a visualization or container will be described as being nested within the filters of higher-level containers.

Process 400 is executed during population or refresh of a visualization. Population or refresh may be triggered automatically in response to any changes made by a user to the dimensions, measures and/or filters of the visualization, selection of a Refresh user interface control, an elapsed refresh time period, or any other suitable event.

At S410, dimension filters associated with a visualization are identified. Process 400 will be described with respect to a single visualization, but may be executed with respect to multiple visualizations independently and in parallel.

The dimension filters associated with a visualization include dimension filters which are associated with the visualization at the visualization level (e.g., filter $Filter_y$ of FIG. 2), and any filters associated with containers in which the visualization is nested. For example, filter $Filter_y$ and filter $Filter_x$ of FIG. 2 are both considered to be associated with visualization Viz1. Similarly, filter $Filter_y$, filter $Filter_x$ and filter $Filter_s$ of FIG. 3 are considered to be associated with visualization Viz1 of FIG. 3. In another example, filter $Filter_z$, filter $Filter_x$ and filter $Filter_s$ of FIG. 3 are considered to be associated with visualization Viz2 of FIG. 3.

From the dimension filters identified at S410, nested dimension filters on a same dimension are identified at S420. For example, if a visualization is associated with a first filter on the Country dimension (at the visualization level) and with a second filter on the Country dimension (at the story level), these two filters are identified at S420 as nested dimension filters on the same dimension. The visualization and the story may or may not be associated with additional filters on other dimensions which were identified at S410.

Flow proceeds to S430 if no nested dimension filters on a same dimension are identified at S420. At S430, a query is transmitted to a data source based on the identified dimension filters as is known in the art. A corresponding result set is received from the data source at S440 and the visualization is updated at S450 using the result set, as is also known in the art.

However, flow proceeds to S460 from S420 if two or more nested dimension filters on a same dimension are identified. The identified nested filters are converted to a composite filter at S460. The composite filter is intended to provide the same results (i.e., the same filtering) as the nested dimension filters from which the composite filter was generated would provide, if applied to the data source individually and successively as described above. Applying the nested dimension filters in this manner is logically-equivalent to implementing an AND-based filter (e.g., NestedDimensionFilter1 AND NestedDimensionFilter2 AND NestedDimensionFilter3). According to some embodiments, the composite filter is an OR-based filter which may be applied using a single query to the backend.

According to one example of S460, filter $Filter_y$ and filter $Filter_x$ of FIG. 2 are both associated with the Sales dimension. Specifically, filter $Filter_y$ is "Sales<20" and filter $Filter_x$ is "Sales<25". Since these filters are nested (i.e., filter $Filter_y$ is associated with visualization Viz1 and filter $Filter_x$ is associated with page Page1), these filters are identified at S420 as nested filters on a same dimension. Accordingly, a composite filter is generated at S460 based on filter $Filter_y$ and filter $Filter_x$. The generated composite filter according to some embodiments is "Sales<20".

Figure 5:
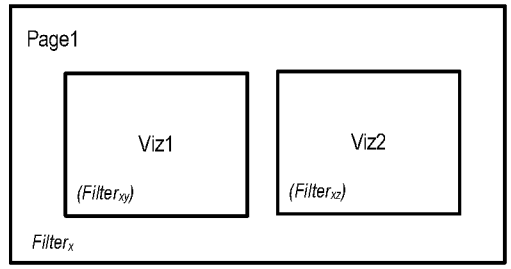
FIG. 5 is a diagram of a user interface illustrating composite filtering of data visualizations according to some embodiments.

FIG. 5 illustrates the visualizations and page container of FIG. 2 after generation of a composite filter according to some embodiments. As shown, visualization Viz1 is associated with composite filter $Filter_{xy}$ (generated based on filters $Filter_x$ and $Filter_y$) and visualization Viz2 is associated with composite filter $Filter_{xz}$ (generated based on filters $Filter_x$ and $Filter_z$).

FIG. 7 is a chart for generating a composite filter based on two nested dimension filters according to some embodiments. To generate a composite filter, the column corresponding to the type of the higher-level filter is identified in the top row of the chart, and the row corresponding to the type of the lower-level filter is identified in the left column of the chart. "Level" refers to level in the container hierarchy. In the present description, a page container is at a higher level than a visualization and a story container is at a higher level than a page container.

The cell at the intersection of the column of the type of the higher-level filter and the row of the type of the lower-level filter describes the generation of the composite filter. In the above example, the higher-level filter (Sales<25) corresponds to the "Less than" column of the top row of the chart, and the lower-level filter (Sales<20) corresponds to the "Less than" row of the left-most column of the chart. The intersection cell indicates "Take the lowest value". Accordingly, the composite filter generated at S460 based on these nested dimension filters is "Sales<20".

Returning to process 400, a query is transmitted to the data source based on the composite filter. The nested dimension filters identified at S420 are not included in the query, but the query also includes any other dimension filters associated with the visualization and identified at S410. A result set is received at S440 and the visualization is updated using the result set at S450.

S420 may comprise identification of more than one set of filters which are nested and associated with a same dimension. For example, one set of dimension filters may be associated with the Time dimension and another set of dimension filters may be associated with the Product dimension. In such instances, S440 comprises conversion of each set of nested dimension filters to a respective composite filter. Accordingly, the query transmitted at S450 is based on each of the respective composite filters.

Figure 6:
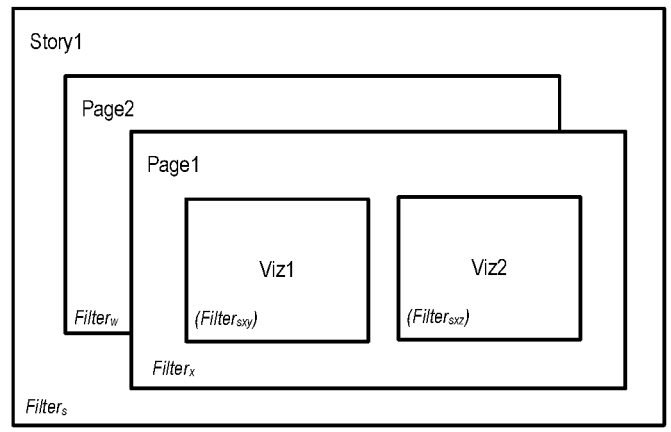
FIG. 6 is a diagram of a user interface illustrating composite filtering of data visualizations according to some embodiments.

FIG. 6 illustrates the visualizations, page containers and story container of FIG. 3 after generation of composite filters at S440 according to some embodiments. As shown, visualization Viz1 is associated with composite filter $Filter_{sxy}$ (generated based on filters $Filter_s$, $Filter_x$ and $Filter_y$) and visualization Viz2 is associated with composite filter $Filter_{sxz}$ (generated based on filters $Filter_s$, $Filter_x$ and $Filter_z$).

In cases such as FIG. 3 and FIG. 6, where more than two nested dimension filters are associated with a same dimension, the composite filter may be generated by generating an intermediate composite filter based on two of the nested dimension filters and then generating another composite filter based on the intermediate composite filter and on another of the nested dimension filters. This process may then continue until all of the nested dimension filters have been used to generate a composite filter.

Figure 8:
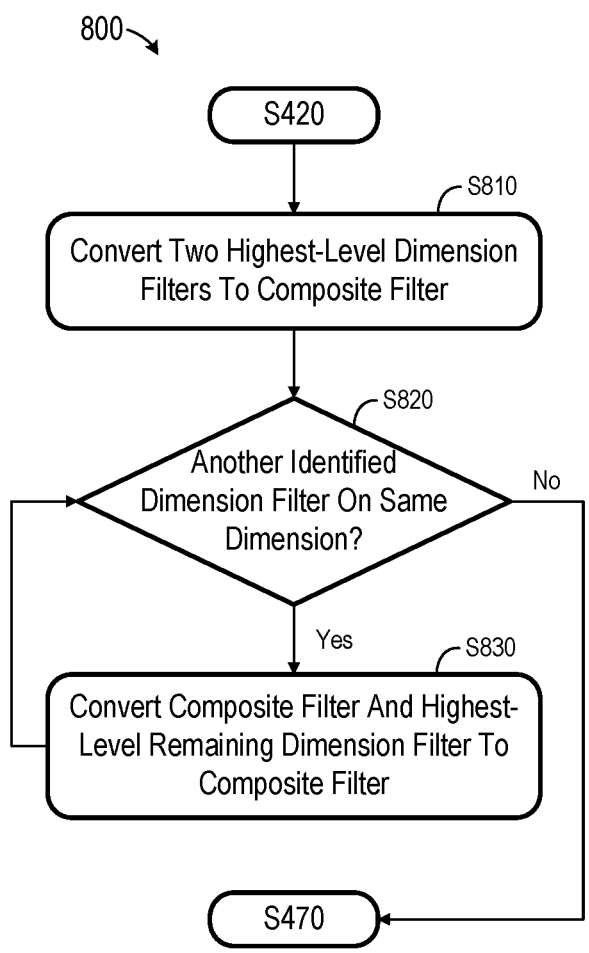
FIG. 8 is a flow diagram of a process according to some embodiments.

FIG. 8 is a flowchart of process 800 to generate a composite filter at S460 according to some embodiments. Initially, the two highest-level dimension filters are converted to a composite filter as described above. Next, at S820, it is determined whether another filter on the same dimension was identified at S420. If not, flow proceeds to S470 and continues as described above.

Alternatively, flow proceeds from S820 to S830 if the determination at S820 is affirmative. At S830, the composite filter and the highest-level remaining dimension filter are converted to a next composite filter. Referring to the above examples, a composite filter may be generated at S810 based on a story-level filter on a particular dimension and on a page-level filter on the particular dimension. At S830, a further composite filter is generated based on the composite filter and a visualization-level filter on the particular dimension.

Flow returns to S820 and continues as described. Accordingly, process 800 may be employed to generate a single composite filter based on any number of container levels.

Figure 9:
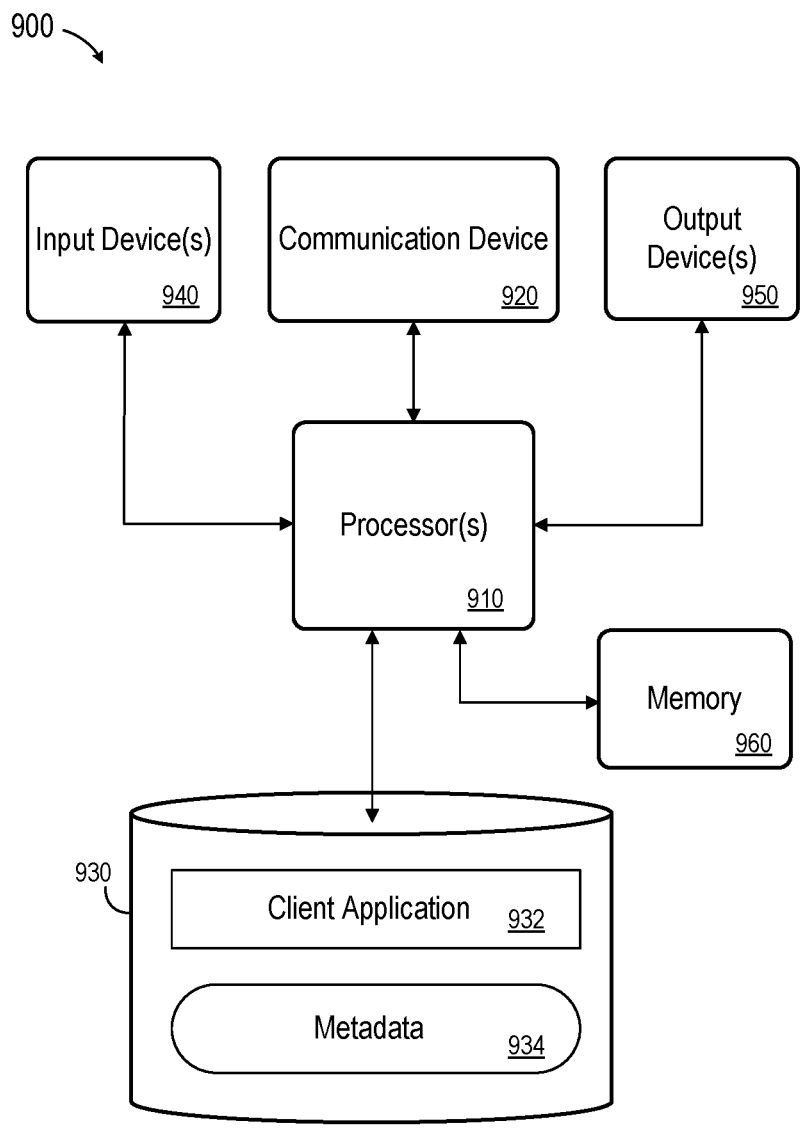
FIG. 9 is a block diagram of a computing system according to some embodiments.

FIG. 9 is a block diagram of computing system 900 according to some embodiments. System 900 may comprise a general-purpose computing apparatus and may execute program code to perform any of the functions described herein. System 900 may comprise an implementation of client system 120 as described above. System 900 may include other unshown elements according to some embodiments.

System 900 includes processor(s) 910 operatively coupled to communication device 920, data storage device 930, one or more input devices 940, one or more output devices 950 and memory 960. Communication device 920 may facilitate communication with external devices, such as a reporting client, or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM), Storage Class Memory (SCM) or any other fast-access memory.

Client application 932 may comprise program code executed by processor 910 (and within the execution engine) to cause system 900 to perform any one or more of the processes described herein. Embodiments are not limited to execution by a single apparatus. Metadata 934 may comprise metadata of dimensions, measures and filters to define visualizations according to some embodiments. Data storage device 930 may also store data and other program code for providing additional functionality and/or which are necessary for operation of apparatus 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a display;
   a data storage device storing processor-executable process steps of a client application; and
   a processor to execute processor-executable process steps of the client application to:
   identify dimension filters associated with a visualization, the visualization defined within a container that is itself associated with one of more dimension filters;
   from the identified dimension filter, identify a plurality of nested dimension filters associated with a first dimension of the visualization;
   generate a composite filter based on the identified plurality of nested dimension filters, wherein generation of a composite filter based on the identified nested dimension filters comprises:
   generation of an intermediate composite filter based on a first identified nested dimension filter and a second identified nested dimension filter; and
   generation of the composite filter based on the intermediate composite filter and a third identified nested dimension filter;
   transmit a query to a data source, the query including the composite filter;
   receive a result set based on an execution of the composite filter of the query from the data source; and
   display the visualization presenting the result set on the display.

2. A system according to claim 1, the processor to execute processor-executable process steps of the client application to:
   from the identified dimension filters, identify nested dimension filters associated with a second dimension of the visualization; and
   generate a second composite filter based on the identified nested dimension filters associated with the second dimension of the visualization,
   wherein the query comprises the composite filter and the second composite filter.

3. A system according to claim 2, wherein generation of a composite filter based on the identified nested dimension filters comprises:
   generation of an intermediate composite filter based on a first identified nested dimension filter and a second identified nested dimension filter; and
   generation of the composite filter based on the intermediate composite filter and a third identified nested dimension filter.

4. A system according to claim 1, wherein the query includes identified dimension filters which are not the identified nested dimension filters.

5. A system according to claim 1, wherein a first one of the identified nested dimension filters is associated with a page container including the visualization.

6. A system according to claim 5, wherein a second one of the identified nested dimension filters is associated with a story container including the page container.

7. A method for a client application executing on a client device, the method comprising:
   identifying dimension filters associated with a visualization, the visualization defined within a container that is itself associated with one of more dimension filters;
   from the identified dimension filters, identifying a plurality of nested dimension filters associated with a first dimension of the visualization;
   generating a composite filter based on the identified plurality of nested dimension filters, wherein generating a composite filter based on the identified nested dimension filters comprises:
   generating an intermediate composite filter based on a first identified nested dimension filter and a second identified nested dimension filter; and
   generating the composite filter based on the intermediate composite filter and a third identified nested dimension filter;
   transmitting a query to a data source, the query including the composite filter;

receiving a result set based on an execution of the composite filter of the query from the data source; and displaying the visualization presenting the result set on the display.

8. A method according to claim 7, further comprising:

from the identified dimension filters, identifying nested dimension filters associated with a second dimension of the visualization; and generating a second composite filter based on the identified nested dimension filters associated with the second dimension, wherein the query comprises the composite filter and the second composite filter.

9. A method according to claim 8, wherein generating a composite filter based on the identified nested dimension filters comprises:

generating an intermediate composite filter based on a first identified nested dimension filter and a second identified nested dimension filter; and generating the composite filter based on the intermediate composite filter and a third identified nested dimension filter.

10. A method according to claim 7, wherein the query includes identified dimension filters which are not the identified nested dimension filters.

11. A method according to claim 7, wherein a first one of the identified nested dimension filters is associated with a page container including the visualization.

12. A method according to claim 11, wherein a second one of the identified nested dimension filters is associated with a story container including the page container.

13. A non-transitory computer-readable medium storing computer-executable process steps which, when executed by a computing device, cause the computing device to:

identify dimension filters associated with a visualization, the visualization defined within a container that is itself associated with one of more dimension filters;

from the identified dimension filters, identify a plurality of nested dimension filters associated with a first dimension of the visualization;

generate a composite filter based on the identified plurality of nested dimension filters, wherein generation of a composite filter based on the identified nested dimension filters comprises:

generation of an intermediate composite filter based on a first identified nested dimension filter and a second identified nested dimension filter; and generation of the composite filter based on the intermediate composite filter and a third identified nested dimension filter;

transmit a query to a data source, the query including the composite filter;

receive a result set based on an execution of the composite filter of the query from the data source; and display the visualization presenting the result set on the display.

14. A non-transitory medium according to claim 13, the computer-executable process steps, when executed by a computing device, cause the computing device to:

from the identified dimension filters, identify nested dimension filters associated with a second dimension of the visualization; and generate a second composite filter based on the identified nested dimension filters associated with the second dimension, wherein the query comprises the composite filter and the second composite filter.

15. A non-transitory medium according to claim 14, wherein generation of a composite filter based on the identified nested dimension filters comprises:

generation of an intermediate composite filter based on a first identified nested dimension filter and a second identified nested dimension filter; and generation of the composite filter based on the intermediate composite filter and a third identified nested dimension filter.

16. A non-transitory medium according to claim 13, wherein the query includes identified dimension filters which are not the identified nested dimension filters.

17. A non-transitory medium according to claim 13, wherein a first one of the identified nested dimension filters is associated with a page container including the visualization, and wherein a second one of the identified nested dimension filters is associated with a story container including the page container.

* * * * *